(12) United States Patent
Degani

(10) Patent No.: US 8,102,021 B2
(45) Date of Patent: Jan. 24, 2012

(54) RF DEVICES

(75) Inventor: Yinon Degani, Highland Park, NJ (US)

(73) Assignee: Sychip Inc., Plano, TX (US)

( * ) Notice: Subject to any disclaimer, the term of this patent is extended or adjusted under 35 U.S.C. 154(b) by 672 days.

(21) Appl. No.: 12/152,104

(22) Filed: May 12, 2008

(65) Prior Publication Data

US 2009/0278690 A1 Nov. 12, 2009

(51) Int. Cl.
*H01L 21/02* (2006.01)

(52) U.S. Cl. ........... 257/532; 257/E29.001; 438/381; 438/393; 438/396; 340/572.1; 340/572.7

(58) Field of Classification Search .......... 438/171, 438/190, 210, 238, 239, 250, 253, 329, 381; 438/393, 396; 257/296, 298, 306, 532, E29.001, 257/E29.218; 340/572.1, 572.7

See application file for complete search history.

(56) References Cited

U.S. PATENT DOCUMENTS

2005/0263767 A1* 12/2005 Yamazaki et al. .......... 257/72
2009/0128332 A1* 5/2009 Lu ........................... 340/572.1

* cited by examiner

*Primary Examiner* — Matthew Landau
*Assistant Examiner* — Colleen E Snow
(74) *Attorney, Agent, or Firm* — P. V. D. Wilde

(57) ABSTRACT

A low cost passive RFID tag uses capacitive or inductive coupling between the RF IC chip and the antenna. Coupling elements are formed directly on the surface of the RF IC chip.

8 Claims, 5 Drawing Sheets

RF DEVICES

FIELD OF THE INVENTION

This invention relates to radio frequency devices and more specifically to radio frequency identification (RFID) devices.

BACKGROUND OF THE INVENTION

Information management systems are being developed to track the location and/or status of a large variety of mobile entities such as products, vehicles, people, animals, etc. A widely used tracking technology uses so-called RFID tags that are placed physically on the items being tracked. Reference herein to "items" being tracked is intended to include the variety of entities just mentioned as well as, more commonly, product inventories.

RFID tags may be active or passive. Active tags typically have associated power systems and can transmit data over modest distances. Passive systems lack internal power but derive transmitting signal power from an incoming RF signal. However, transmitting distances with passive RFID tags are limited. To read a large number of RFID tags, spread over a wide physical area, requires either a large number of RFID readers, or a reliable system of moving RFID readers. One proposed solution to this problem is to use active RFID tags on the products. However, active tags are relatively costly. Although they lend more function to a tracking system, and transmit more effectively, passive tags are typically more cost effective where inventories being tracked are large.

In practical commercial applications, passive RFID devices should be inexpensive and easily applied to items being tracked. A common approach is to form the RF components on a small RF IC device. The RF IC device and the RF antenna are mounted on a substrate, typically paper or plastic.

In the manufacture of inexpensive RFID tags, like that just described, fabricating the combination of the RF IC chip and the RF antenna on a suitable inexpensive substrate, and attaching the substrate to the item being tracked to the substrate poses technical and economic challenges.

An attractive solution to these challenges is described and claimed in U.S. Patent Publication 20080061983. The RF antenna is formed as a serpentine metal runner on a substrate. The RFIC device is bonded to a ceramic chip carrier and the ceramic chip carrier is capacitively connected to the antenna. This solution is effective but adds another element, and additional cost, to the RFID tag.

STATEMENT OF THE INVENTION

We have developed an improved passive RFID tag that uses capacitive or inductive coupling between the RF IC chip and the antenna but is simpler and more cost effective. Coupling elements are formed directly on the RF IC chip, thus eliminating the ceramic chip carrier of the prior art, and substantially reducing the cost of the RFID tag.

BRIEF DESCRIPTION OF THE DRAWING

The invention may be better understood when considered in conjunction with the drawing in which.

DETAILED DESCRIPTION OF THE INVENTION

Figure 1:
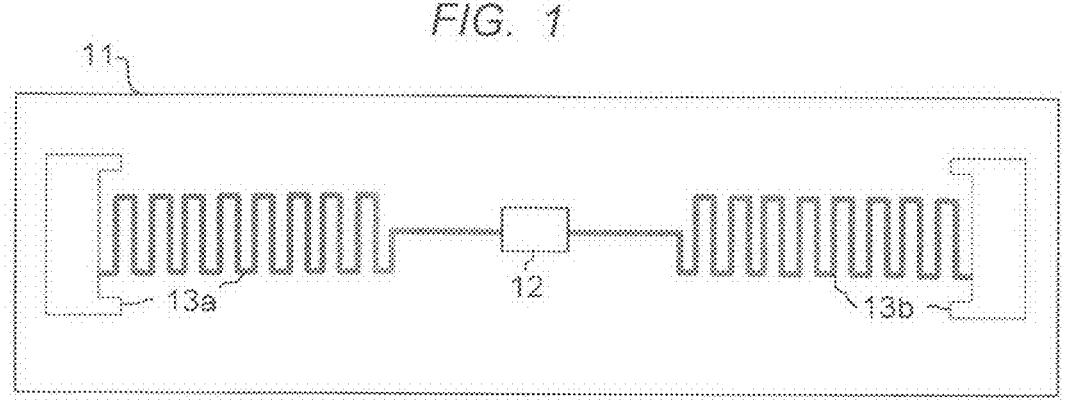
FIG. 1 is a schematic view of an RFID tag showing one arrangement for the combination of RF antenna and RF IC chip.

FIG. 1 is a schematic representation of a passive RFID tag with substrate 11, antenna sections 13a and 13b, and RF IC chip 12. RFID tags are miniaturized as much as practical to allow for the essential elements of a semiconductor IC chip 12, typically a CMOS RF transceiver/memory chip, and an antenna. The antenna in this design has sections 13a and 13b, each electrically connected to the RF IC chip. The RF IC transceiver/memory chip contains a read-only memory encoded with item data. The antenna is a serpentine metal conductor that receives small amounts of power from the RFID reader by inductive coupling. When the RF IC chip receives an interrogation signal, it is powered to transmit item data back to the RFID reader via the antenna.

Passive RFID tag designs are available in many sizes and designs. Common characteristics are a platform, an IC chip, and an antenna. Depending on the application the platform may be glass, ceramic, epoxy, paper, cardboard, epoxy, or any suitable plastic. For low cost, the substrate may be heavy paper or plastic. The RF antenna sections 13a and 13b are typically printed on the substrate by screen printing or other low cost process adapted for depositing metal patterns. The metal for the antenna is typically aluminum or copper. An onboard power source is not included in a passive RFID tag. Power for the tag is derived from RF signals in the vicinity of the tag. The tag responds to the reader using RF backscatter, which basically reflects the carrier wave from the reader after encoding data on the carrier wave.

Variables in the communication specification include the frequency of the carrier, the bit data rate, the method of encoding and any other parameters that may be needed. ISO 18000 and EPCGlobal are the standards for this interface. The interface may also include an anti-collision protocol that allows more than one tag in the range of the reader to signal concurrently. There are many specific implementations of this, and these form no part of the invention.

In a typical RFID system the RFID tag is read by an RFID reader (not shown) and the information recorded at a central information store.

As mentioned, the RFID tag shown in FIG. 1 is a passive device, adapted to be attached to the item being tracked. However, the RFID tag may be provided with on-board power to extend the range and functionality of the system. The reader is an active RFID device that communicates with large numbers of passive RFID tags, and typically stores data in the reader, and/or relays data to a central database. The central database keeps data for all items in the system. In many applications, for example, large retail outlets, the RFID readers are mobile devices that are moved around the vicinity of the RFID tags to record the RFID tag data. Mobility in this application is necessary since the transmission distance between the RFID tags and the RFID readers is very limited, for example, tens of meters maximum, and typically less than 10 meters. The RFID readers are powered to extend the range of transmission between the RFID readers and a remotely located receiver. That allows the option of using a RFID reader to simply relay RFID tags to a central database. More typically, the reader reads the passive RFID and stores the information locally. This data may be downloaded to the central store periodically, by placing the reader in a docking device that is connected by wireless or hardwired link to the central database. In the latter case, a wireless link between the RFID reader and a remote receiver may or may not be used. Details of suitable RFID reader, and the overall system, can be found elsewhere and need no additional explanation here.

Figure 2:
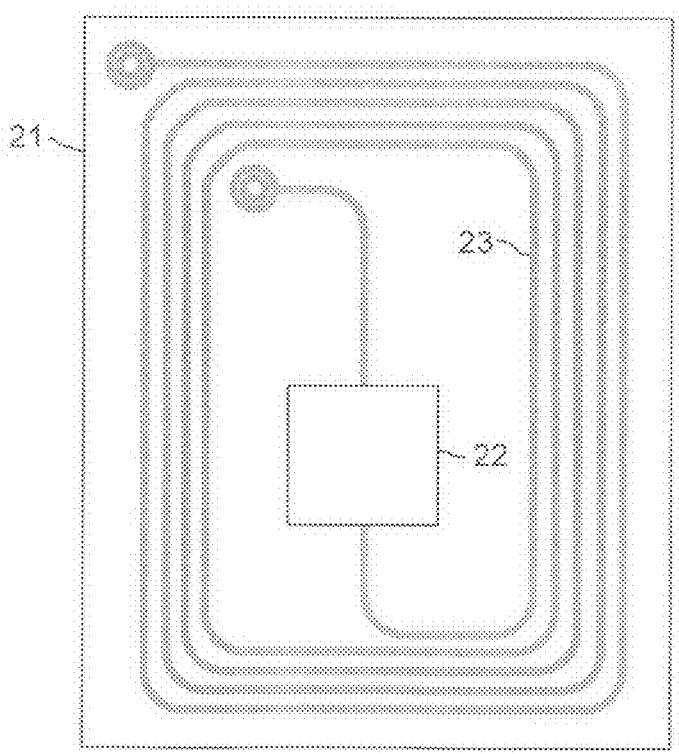
FIG. 2 is a schematic view of an RFID tag showing an alternative arrangement for the combination of RF antenna and RF IC chip, to illustrate the variety of useful physical configurations for this combination of elements.

FIG. 2 illustrates the variety of forms passive RFID tags may assume. FIG. 2 shows substrate 21, RF IC chip 22, and serpentine RF antenna 23.

Figure 3:
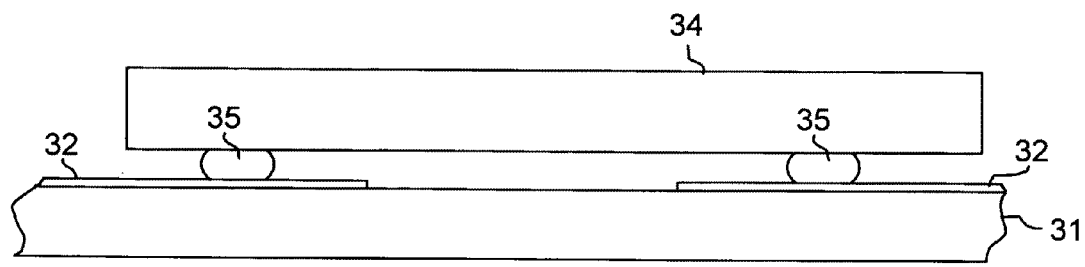
FIG. 3 illustrates one method for attaching the RF IC chip to the RF antenna.

In both of the arrangements shown, i.e. FIG. 1 and FIG. 2, the I/O interconnections for the RF IC chip strap the ends of the antenna runners. The antenna sections each have a bonding area at the ends of each section. A typical interconnection is shown in FIG. 3, where the RF IC chip 34 is solder bumped to the bonding area of the antenna runners 32, using solder bumps 35. The RFID tag substrate is indicated at 31. Other conductive attachments may be used, for example, conductive epoxy. Combinations of solder bumps and conductive epoxy layers are also useful. In some cases it may be preferred to use gold solder bumps on the RF IC chip, and conductive epoxy on the substrate.

In a typical use environment, RFID tags may experience rough handling while in storage and during attachment to the items being tracked. Thus, while inexpensive to produce, they should be robust in use. As already indicated, cost considerations favor paper or plastic for the substrate material. It is also useful, in some applications, for the tag substrates to be somewhat flexible. That allows the use of tape storage and dispenser systems, and facilitates attachment of the tags to a variety of surfaces and shapes. It is intuitively evident that the physical attachment of the RF IC chip to the substrate elements in FIG. 3 may not be well adapted for some of these use environments. Moreover, recognizing that the tags are preferably small, the step used in manufacture to attach the RF IC chip to the substrate requires close alignment between the RF IC chip and interconnection pads on the substrate.

To address at least some of these issues it has been proposed to use a capacitive or inductive interconnection between the RF IC device and the substrate. This is described in considerable detail in U.S. Patent Publication 20080061983, referenced earlier. That patent publication is incorporated herein by reference. The approach described in that publication is illustrated in FIG. 4.

Figure 4:
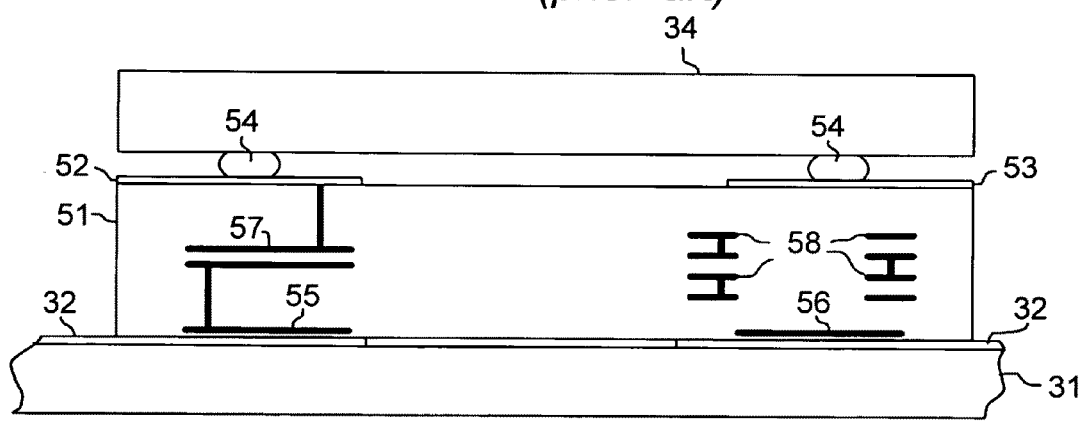
FIG. 4 shows an alternative method for attaching the RF IC chip to the RF antenna using a ceramic chip carrier, and coupling the RF IC chip to the antenna by capacitive coupling.

In the embodiment of FIG. 4, a ceramic chip carrier 51 is inserted between the RF IC device 34 and substrate 31. The antenna leads on the substrate are shown at 32. The RF IC device 34 is attached to the ceramic chip carrier with solder bumps 54. The solder bumps connect with bond pads 52 and 53 on the ceramic chip carrier. The ceramic chip carrier contains a capacitor pattern, shown on the left side of FIG. 4, and represented by capacitor 57 and capacitor plate 55, an inductor pattern, shown on the right side of FIG. 4, and represented by inductor elements 58 and 56. The elements that couple to antenna strips 32 on substrate 31 are the capacitive plate 55 and the inductor pattern represented by 56. FIG. 4 additionally shows matching elements 57 and 58 for matching impedance and capacitance of the interconnections. These are made by known techniques in the multi-level chip carrier 51.

Figure 5A:
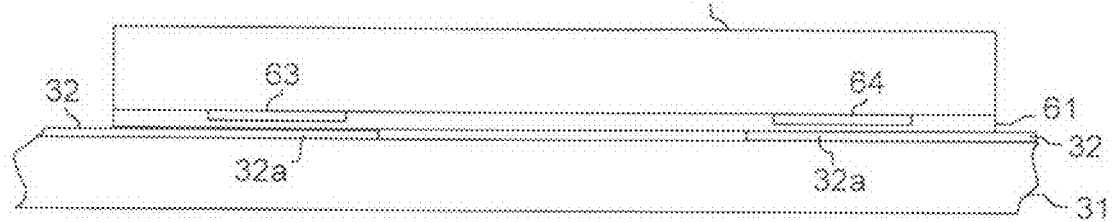
FIGS. 5A and 5B illustrate generally the approach of the invention where capacitive coupling elements are formed directly on the RF IC chip.
Figure 5B:
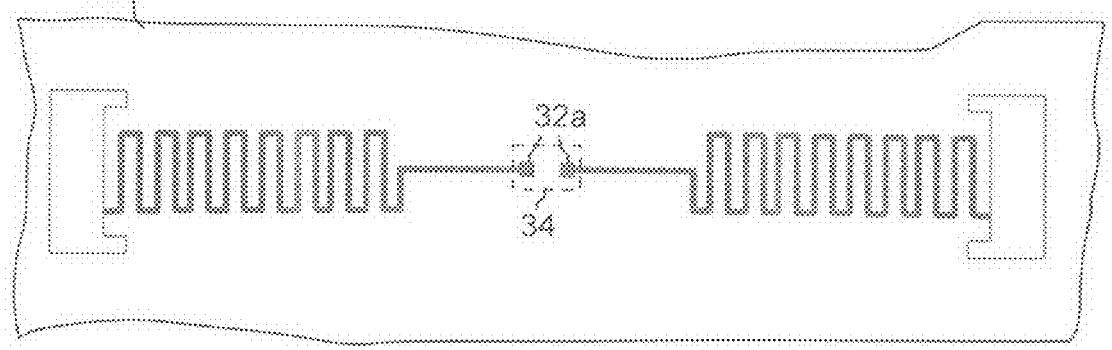

FIG. 5A illustrates an embodiment of the invention where the RF IC chip is interconnected to the antenna 32 via integrated passive device (IPD) elements 63 and 64. Elements 63 and 64 are capacitor plates that electrically connect the RF IC chip 34 to the antenna 32 by capacitive coupling. The IPD elements are formed directly on the RF IC chip. The portions 32a of each of the antenna sections are the bottom plates of the coupling capacitors. These are shown in more detail in FIG. 5B. Typically the capacitor plates 32a will have a width greater than the antenna runners 32.

Figure 6:
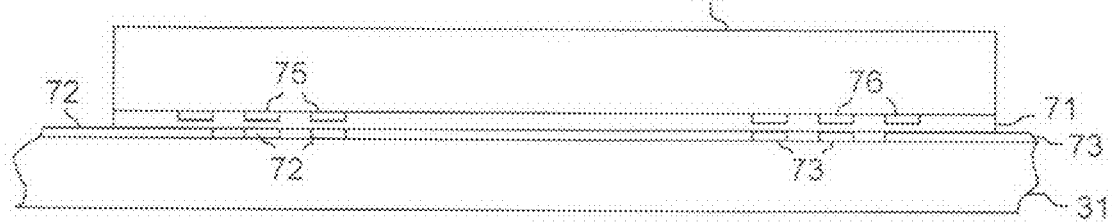
FIG. 6 illustrates generally an alternative approach to that of FIG. 5A where the RF IC chip and the antenna are inductively coupled.

FIG. 6 shows an alternative embodiment of the invention wherein the RF IC chip 34 is electrically connected to antenna leads 32 via IPD elements 75 and 76. Elements 75 and 76 represent windings of a spiral inductor pattern. These IPD elements inductively couple to corresponding inductor patterns 72 and 73 on substrate 31.

An alternative arrangement suitable for implementing the invention is to use capacitive elements for interconnecting one lead of the RF IC chip to the substrate, and inductor elements for interconnecting the other lead of the RF IC chip to the substrate.

Figure 7:
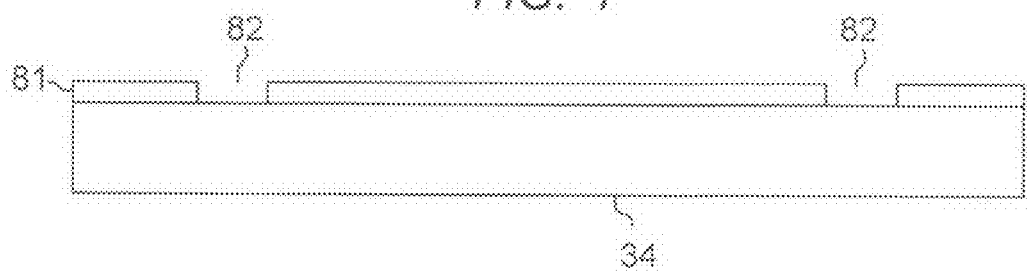
FIGS. 7-9 are schematic illustrations of thin film processing steps for forming the embodiment of FIG. 5.
Figure 8:
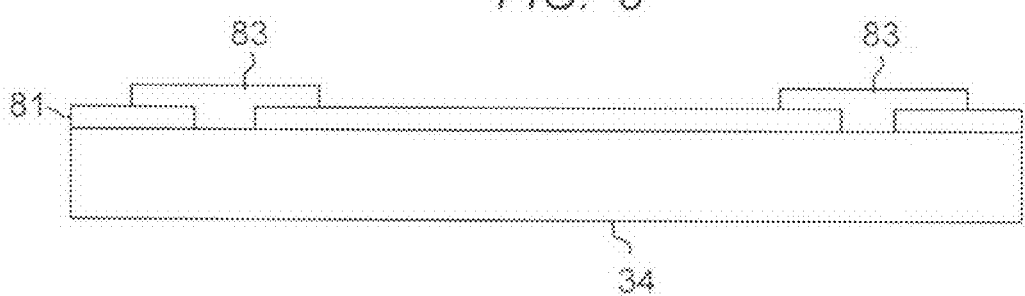
Figure 9:
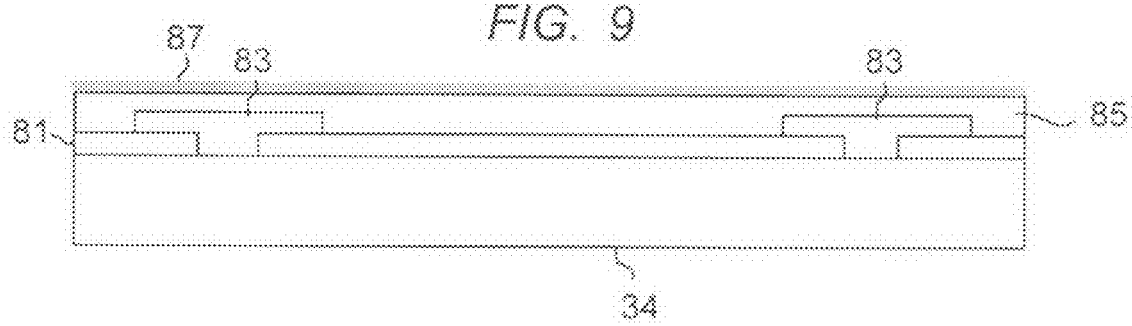

FIGS. 7-9 illustrate technology useful in the manufacture of the embodiment of FIG. 5A.

FIG. 7 shows the RF IC chip with the final passivating layer 81. Layer 81 is typically silicon nitride or silicon dioxide, but may be any suitable choice. This layer is typically the final layer, and thus the surface layer, of a typical IC chip. It performs a passivating function that protects the IC chip elements. Vias 82 are formed in layer 81 for the I/O interconnections. I/O pads 83 are formed in vias 82, as shown in FIG. 8. These steps resemble the conventional steps for forming solder bond pads for flip chip bonding the RF IC chip to an interconnection substrate. However, the pads 83 in this embodiment serve not as solder bond pads, or under bump metallization, but as capacitor plates for capacitively coupling the RF IC chip to the antenna leads on the substrate. Accordingly it is preferred that the size of the plates be relatively large and flat. For example, the width of capacitor plate 83 would be greater than twice the width of via 82.

The capacitor plates 83 may be formed by sputtering a blanket layer of aluminum, 0.5 to 2 microns in thickness, and patterning the aluminum layer using dry etching. The dielectric layer for the interconnection capacitor, shown at 85 in FIG. 9, may be silicon nitride deposited to a thickness of 1000 to 5000 angstroms using plasma enhanced CVD. Any suitable alternative deposition method may be used. Also, a variety of dielectric materials, such as silicon dioxide, or combinations of materials, such as silicon nitride/silicon dioxide, may be substituted.

The IPD subassembly of FIG. 9 is preferably bonded to the antenna leads 32 and substrate 31 (see FIG. 5) using a non-conductive adhesive such as epoxy, or other suitable adhesive. Layer 87 in FIG. 9 represents a non-conductive adhesive layer. Alternatively the adhesive may be applied to the substrate, or to both the substrate and the RF IC chip/capacitor subassembly.

An approach similar to that described in connection with FIGS. 7-9 may be used to construct the embodiment of FIG. 6, merely substituting inductor spirals for the capacitor plates. Similarly, combinations of capacitive and inductive coupling elements may be fabricated.

The preferred embodiment of the invention is the use of capacitors for coupling the RF IC chip to the substrate. This is due in part to the absence of critical alignment between the RF IC chip/capacitor subassembly and the substrate, thus eliminating a critical tolerance in the manufacturing process. As should be evident to those skilled in the art, the inductor spirals in the embodiment of FIG. 6, or in device assemblies using a combination of capacitor and inductor elements, should be precisely aligned. It is also easily seen that the alignment tolerance for the capacitively coupled embodiment is much less restrictive.

The RF IC is referred to above as a chip. As mentioned earlier, a typical RFID tag has an RF transceiver chip and a CMOS (or other) memory chip. In some embodiments these may be separate chips, or combined as a multi-chip module. However, for low cost RFID tags a single RF IC chip is preferred.

In the embodiment described in FIGS. 5A, 5B and 7-9, the dielectric layer for the coupling capacitors (layer 61 in FIG. 5A, and 85 in FIG. 9), is formed on the RF IC chip/capacitor plate subassembly. Alternatively, the top surface of the RF IC chip/capacitor plate subassembly may have a bare metal plate, and the dielectric layer for the coupling capacitors may be formed on the interconnection areas of the antenna sections, or as a blanket layer over the substrate 31,34.

When the RF IC chip is attached to the substrate 31 using, for example, an adhesive attachment layer as shown at 87 in FIG. 9, there may be a substantial variation in capacitance of the coupling between RF IC chip and the substrate from one attachment to another. Several factors may influence the value of this capacitance, for example, the material of the adhesive, the thickness of the adhesive, the degree of crosslinking of the adhesive, etc. To reduce the effect of this variable it may be preferred to add a supplemental series capacitor element to the connection. If the capacitance of the supplemental capacitors is large compared with the capacitance between the plates 63, 64 and the capacitor plates associated with the antenna, which may be referred to as the coupling capacitance, this has the effect of overwhelming variations in the coupling capacitance. The overall RFID tag circuit is then designed based largely on the value of the supplemental capacitor.

For example, if the coupling capacitance is 0.5 pf, and the capacitance of the supplemental capacitor is 5 pf, a 50% variation in the coupling capacitance will result in only a 5% variation in the overall circuit capacitance. Without the supplemental capacitor, the variation in the capacitance of the RFID tag circuit would be 50%.

Figure 10:
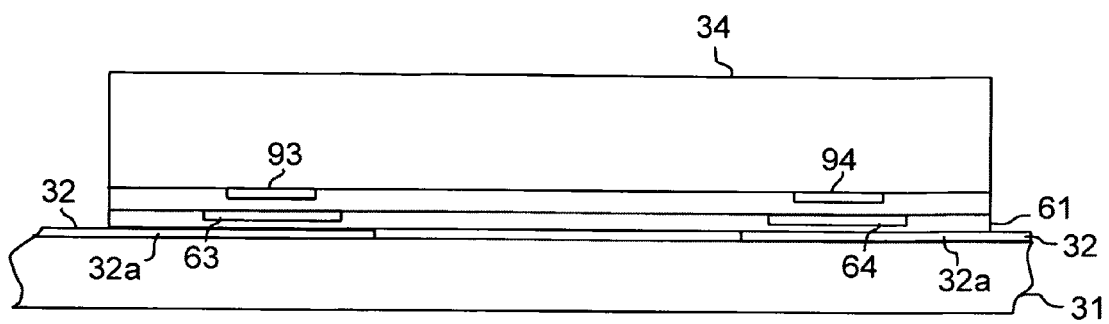
FIG. 10 is a view similar to that of FIG. 5A showing a preferred embodiment of the invention.

The addition of supplemental capacitors is shown in FIG. 10. Elements in common with FIG. 5A carry the same reference numbers. The added capacitor plates are 93 and 94. They may be the same size as plates 63 and 64, or different. Recall that there is an advantage, in terms of aligning the coupling capacitor plates to the underlying antenna capacitor plates, in making the coupling capacitor plates large. However, that motive is absent with respect to the supplemental capacitor plates 93 and 94, so these plates may be smaller, as suggested in FIG. 10. The supplemental capacitor plates may be formed in the same manner as plates 63 and 64, i.e., in a thin film method as shown in FIGS. 7-9. The thickness of the layers shown in FIG. 10 is exaggerated for clarity. Using a typical thin film method for forming the supplemental capacitor plates, the values of the capacitance of the supplemental capacitors can be tightly controlled. An alternative to the arrangement of FIG. 10 is to use two plates for the supplemental capacitors, and connect the bottom plates to the coupling capacitor plate. However, while within the scope of the invention, this adds more capacitor plates.

In concluding the detailed description it is evident that various additional modifications of this invention may occur to those skilled in the art. All deviations from the specific teachings of this specification that basically rely on the principles and their equivalents through which the art has been advanced are properly considered within the scope of the invention as described and claimed.

The invention claimed is:

1. RFID tag comprising:
   a) a substrate,
   b) an antenna formed on the substrate, the antenna comprising an antenna capacitor plate deposited on the substrate,
   c) an RF IC chip, the RF IC chip comprising at least one coupling capacitor plate deposited on a surface of the RF IC chip, the said surface of the RF IC chip bonded to the substrate and to the antenna so that the coupling capacitor overlies the antenna capacitor plate so as to electrically couple RF signals between the RF IC chip and the antenna,
the RFID tag further including at least one supplemental capacitor plate between the RF IC chip and the coupling capacitor plate.

2. The RFID tag of claim 1 including a dielectric layer formed between the coupling capacitor plate on the surface of the RF IC chip and the antenna capacitor plate.

3. The RFID tag of claim 1 wherein the RF IC chip has two coupling capacitor plates deposited on the surface of the RF IC chip, and the antenna has two antenna capacitor plates, with the coupling capacitor plates overlying the antenna capacitor plates.

4. The RFID tag of claim 1 wherein the antenna sections are serpentined metal patterns.

5. The RFID tag of claim 1 wherein the RF IC chip has a surface passivating layer, and the coupling capacitor plate is deposited on the surface passivating layer.

6. The RFID tag of claim 5 wherein the coupling capacitor plate on the surface passivating layer is connected to the RF IC chip through a via in the passivating layer.

7. The RFID tag of claim 6 wherein the width of the coupling capacitor plate is greater than twice the width of the via.

8. The RFID tag of claim 1 wherein the substrate comprises paper or plastic.

* * * * *